(12) United States Patent
Yamada

(10) Patent No.: US 6,887,177 B1
(45) Date of Patent: May 3, 2005

(54) TRANSFER FOR A FOUR-WHEEL DRIVE VEHICLE

(75) Inventor: Hiroaki Yamada, Shizuoka-ken (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 10/745,189

(22) Filed: Dec. 22, 2003

(30) Foreign Application Priority Data

Dec. 24, 2002 (JP) ........................................ 2002-372287

(51) Int. Cl.[7] .......................... F16H 37/08; F16H 48/30
(52) U.S. Cl. ..................................... 475/203; 180/250
(58) Field of Search .......................... 475/201–3, 198, 475/210, 225; 180/248–50

(56) References Cited

U.S. PATENT DOCUMENTS

| | | | | |
|---|---|---|---|---|
| 3,848,691 A | * | 11/1974 | Dolan | 475/206 |
| 3,908,775 A | * | 9/1975 | Van Fossen | 180/250 |
| 4,644,822 A | * | 2/1987 | Batchelor | 475/204 |
| 5,036,940 A | * | 8/1991 | Takemura | 180/249 |
| 5,117,937 A | | 6/1992 | Namioka | |
| 5,167,164 A | | 12/1992 | Maekawa et al. | |
| 5,168,956 A | | 12/1992 | Namioka | |
| 5,183,132 A | | 2/1993 | Fujisawa | |

FOREIGN PATENT DOCUMENTS

| | | |
|---|---|---|
| JP | 2-204133 | 8/1990 |
| JP | 5-42838 | 2/1993 |
| JP | 6-17889 | 1/1994 |
| JP | 6-341515 | 12/1994 |

* cited by examiner

*Primary Examiner*—Roger Pang
(74) *Attorney, Agent, or Firm*—Flynn, Thiel, Boutell & Tanis, PC

(57) ABSTRACT

A transfer arrangement for a four-wheel drive vehicle having an input shaft, a transmission, and a center differential. The transmission includes a first gear attached to the input shaft, a first counter gear attached to a countershaft in parallel with the input shaft to receive the rotation of the first gear, a second counter gear fixed to the countershaft and rotating therewith, and a second gear aligned with the input shaft and rotatably supported along the input shaft to receive the rotation of the second counter gear. High speed-side and low speed-side output parts are attached to the first and second gears respectively. The center differential is disposed between the high speed-side and low speed-side output parts. An engaging device disposed adjacent the center differential selectively engages with the high speed-side and low speed-side output parts.

12 Claims, 5 Drawing Sheets

TRANSFER FOR A FOUR-WHEEL DRIVE VEHICLE

FIELD OF THE INVENTION

This invention relates to a power transfer arrangement for a four-wheel drive vehicle, and more particularly to a transfer arrangement for a four-wheel drive vehicle which eliminates a space for a hub dedicated for a transmission along with a connecting shaft for connection between the transmission and a center differential so as to reduce the axial length of the transfer arrangement.

BACKGROUND OF THE INVENTION

Four-wheel drive vehicles are equipped with a transmission to convert the driving force of an internal combustion engine, and a transfer arrangement to distribute the power or driving force input from the transmission to two output shafts. Some four-wheel drive vehicles are equipped with a center differential to permit the two output shafts to turn at different speeds.

Examples of four-wheel drive wheels of the above type are illustrated by JP Laid-Open No. H02-204133, JP Laid-Open No. H05-42838, JP Laid-Open No. H06-17889, and JP Laid-Open No. H06-341515

In a conventional transfer arrangement for the four-wheel drive vehicle, e.g., the transfer for a part-time four-wheel drive (referred to as "4WD") vehicle equipped with a switching system between "high" and "low" ranges, there are inconveniences described below when the system is equipped with the center differential to provide a full-time four-wheel drive position. (1) The transfer substantially increases in length, since the transfer comprises three parts, i.e., a switching part to switch between "high" and "low" ranges, a switching part between "2WD" and "4WD", and a center differential. (2) When the switching part between "high" and "low" ranges is provided with planetary gears to avoid the increase in length of the transfer, the transfer becomes larger in a radial direction of input and output shafts, i.e., in a widthwise direction of the transfer (in other words, a "fat-body phenomenon"). A floor tunnel needs to extend its width, thereby narrowing the inner space.

In order to prevent this "fat-body phenomenon", it is required that the switching part for switching between "high" and "low" ranges is comprised as a parallel shaft type, and this switching part and the center differential are effectively positioned to reduce overall length of the transfer.

For this reason, the purpose of this invention is to shrink the size of the transfer arrangement which converts the torque transmitted from the power source to the input shaft into high and low speeds and transmits to the center differential.

In order to obviate or at least minimize the above inconvenience, the present invention provides a transfer arrangement for a four-wheel drive vehicle having an input shaft into which the torque from the power source is transmitted, a transmission which converts the torque of the input shaft into high and low speeds, and a center differential aligned with the input shaft to distribute the torque output from the transmission into front and rear wheels of the vehicle. The transmission includes a first gear attached to the input shaft, a first counter gear attached to a countershaft in parallel with the input shaft to receive the rotation of the first gear, a second counter gear integrated to the countershaft and rotating therewith, and a second gear aligned with the input shaft and rotatably supported along the input shaft to receive the rotation of the second counter gear. High speed-side and low speed-side output parts are attached to the first and second gears respectively. The center differential is disposed between the high speed-side and low speed-side output parts. An engaging device is disposed adjacent to the center differential to selectively engage with the high speed-side and low speed-side output parts.

Accordingly, this configuration eliminates the space needed for the hub dedicated to the transmission and the connection shaft to connect the hub with the center differential, so that the axial length of the transfer arrangement becomes smaller.

The present invention will now be described in specific detail with reference to the accompanying drawings.

DETAILED DESCRIPTION

Figure 1:
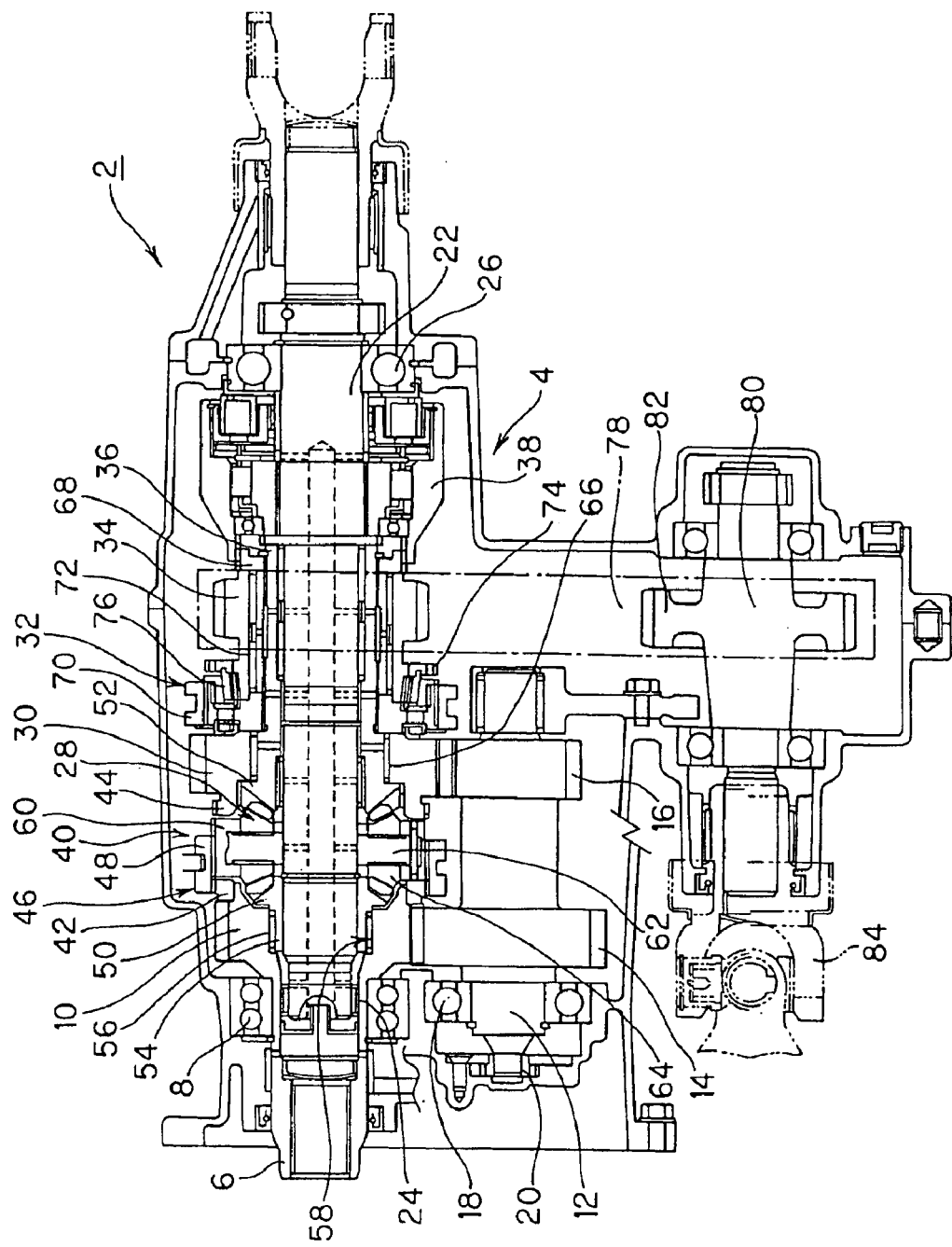
FIG. 1 is a schematic cross-sectional view of a transfer arrangement for a four-wheel drive vehicle according to an embodiment of the present invention.

FIGS. 1–5 illustrate an embodiment of this invention. FIG. 1 shows a transfer arrangement 2. The transfer arrangement 2 is connected to a change-speed transmission (not shown) of an internal combustion engine as a power source which is conventionally disposed longitudinally and toward the front of a four-wheel drive vehicle (not shown). The transfer arrangement 2 supports an input shaft 6 through an input shaft bearing 8 in a transfer case or housing 4. The input shaft 6 has a front end thereof connected to an output shaft (not shown) of the change-speed transmission (not shown). The other or rear end of input shaft 6 has a first gear 10 fixed, here integrated, thereon for changing speed. The gear 10 is part of a transmission which converts the rotation of input shaft 6 into high and low speeds, as explained below.

In the transfer case 4, a countershaft 12 is supported in parallel with the input shaft 6 through a bearing 18. The countershaft 12 integrates a first counter gear 14 in mesh with the first gear 10, and a second counter gear 16 axially spaced apart from the first counter gear 14. A lubricating oil pump 20 is attached to a portion of shaft 12 that protrudes from the bearing 18

A rear wheel-side output shaft 22 is aligned with and serially connected to the input shaft 6, and has one end thereof penetrating the first gear 10 so as to be rotatably disposed within the input shaft 6 through a needle roller bearing 24 attached around the output shaft 22, and has the other end thereof supported on the transfer case 4 through a bearing 26 for communication with rear wheels (not shown) of the vehicle.

Further, the rear wheel-side output shaft 22 includes at the outer circumference thereof: a center differential 28 which distributes the output power delivered from the first gear 10 of the input shaft 6 to the front and rear vehicle wheels; a second gear 30 for low speed; a four-wheel drive shifting mechanism 32 to switch between two-wheel drive and four-wheel drive; a drive sprocket 34; a front wheel-side output shaft 36; and a conventional differential controller 38 to control the respective front and rear wheel-side output shafts 36 and 22 so that they can turn at different speeds so as to allow slip therebetween.

More particularly, a high/low speed transmission 40 is defined by the first gear 10 attached to the input shaft 6, the first counter gear 14 attached to the countershaft 12 in parallel with the input shaft 6 to receive the rotation of the first gear 10, the second counter gear 16 integrated to the countershaft 12 and rotating therewith, and the second gear 30 aligned with the input shaft 6 and rotatably supported along the input shaft 6 to receive the rotation of the second counter gear 16. The transmission 40 converts the rotation of the input shaft 6 into high and low speeds.

In addition, the first and second gears 10, 30 are provided with high speed-side and low speed-side output parts 42, 44 respectively. The center differential 28 is disposed between the high and low speed-side output parts 42, 44, and is provided with an engaging device 46 to selectively engage with the high speed-side and low speed-side output parts 42, 44. More particularly, this engaging device 46 includes a high and low speed-switching sleeve 48 nonrotatably but slidably engaged on the rotatable rim or housing of the center differential 28.

The center differential 28 is provided with a pair of differential side gears 50, 52. The differential side gear 50 toward the first gear 10 includes a shaft portion 54 extending inwardly of the first gear 10. A needle roller bearing 56 to rotatably support the shaft portion 54 is maintained in a bearing holding hole 58 defined inwardly of the first gear 10. The reference numeral 60 designates the rotatable rim or housing of the center differential 28, 62 designates a pinion shaft, and 64 designates a differential pinion.

In addition, the other differential side gear 52 toward the second gear 30 is fixed to and includes the front wheel-side output shaft 36 which penetrates and extends through the second gear 30. The second gear 30 is supported on the front wheel-side output shaft 36 through a needle roller bearing 66.

The second gear 30 has a tooth having a width which covers and surrounds the outer circumference of differential side gear 52.

Further, the front wheel-side output shaft 36 has an intermediate shaft 68 fitted therearound so that the drive sprocket 34 is rotatably supported through a bearing mounted to the intermediate shaft 68 so as to transmit the rotational driving force to the front wheels. The drive sprocket 34 is mounted adjacent to the four-wheel drive shifting mechanism 32 which engages and disengages the drive sprocket 34 to the front wheel-side output shaft 36.

This four-wheel drive shifting mechanism 32 includes a sleeve 70 to switch between two-wheel and four-wheel drives, a sleeve-engaging portion 74 integrally formed on the drive sprocket 34 through a shaft portion 72, and a synchronizer 76.

Further, the differential side gear 50 toward the first gear 10 is connected with the rear wheel-side output shaft 22 which penetrates and extends rearwardly through the rear differential side gear 52 and through the front wheel-side output shaft 36. A conveyance member 78 or chain is entrained around the circumference of the drive sprocket 34. Between the intermediate shaft 68 and the rear wheel-side output shaft 22, rearwardly of the drive sprocket 34, the differential controller 38 is mounted to control the front and rear wheel-side output shafts 36 and 22 to turn at different speeds in a conventional manner.

The reference numeral 80 designates a driven sprocket shaft which is parallel to the output shafts, 82 a driven sprocket, and 84 a front wheel-side output portion.

The operation of this embodiment is described below.

Figure 5:
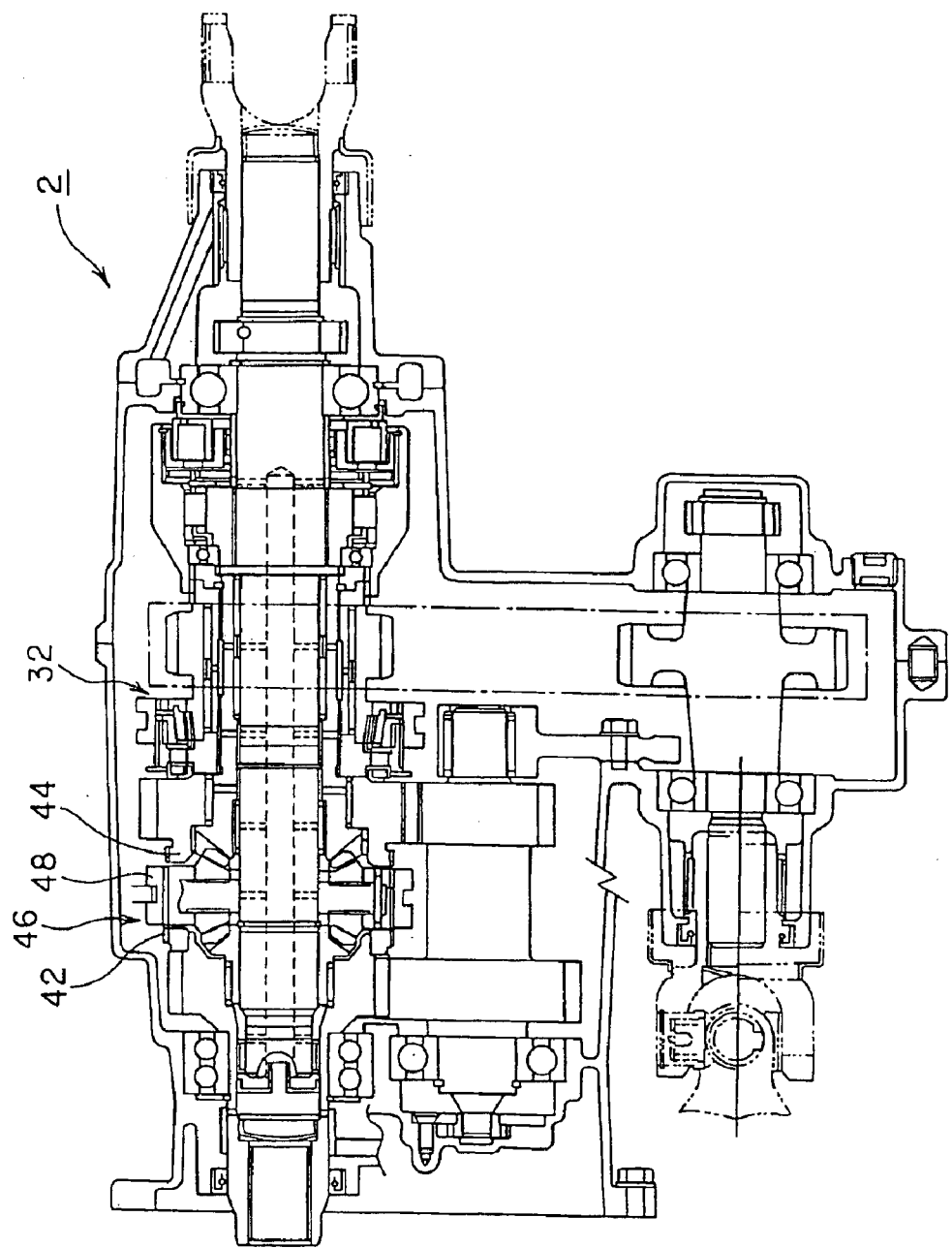
FIG. 5 is a schematic cross-sectional view of the transfer arrangement in a neutral state.

FIG. 5 shows the transfer arrangement 2 in a neutral state wherein the wheels are not driven since the differential shifter sleeve 48 is disengaged from gears 10 and 30.

Figure 2:
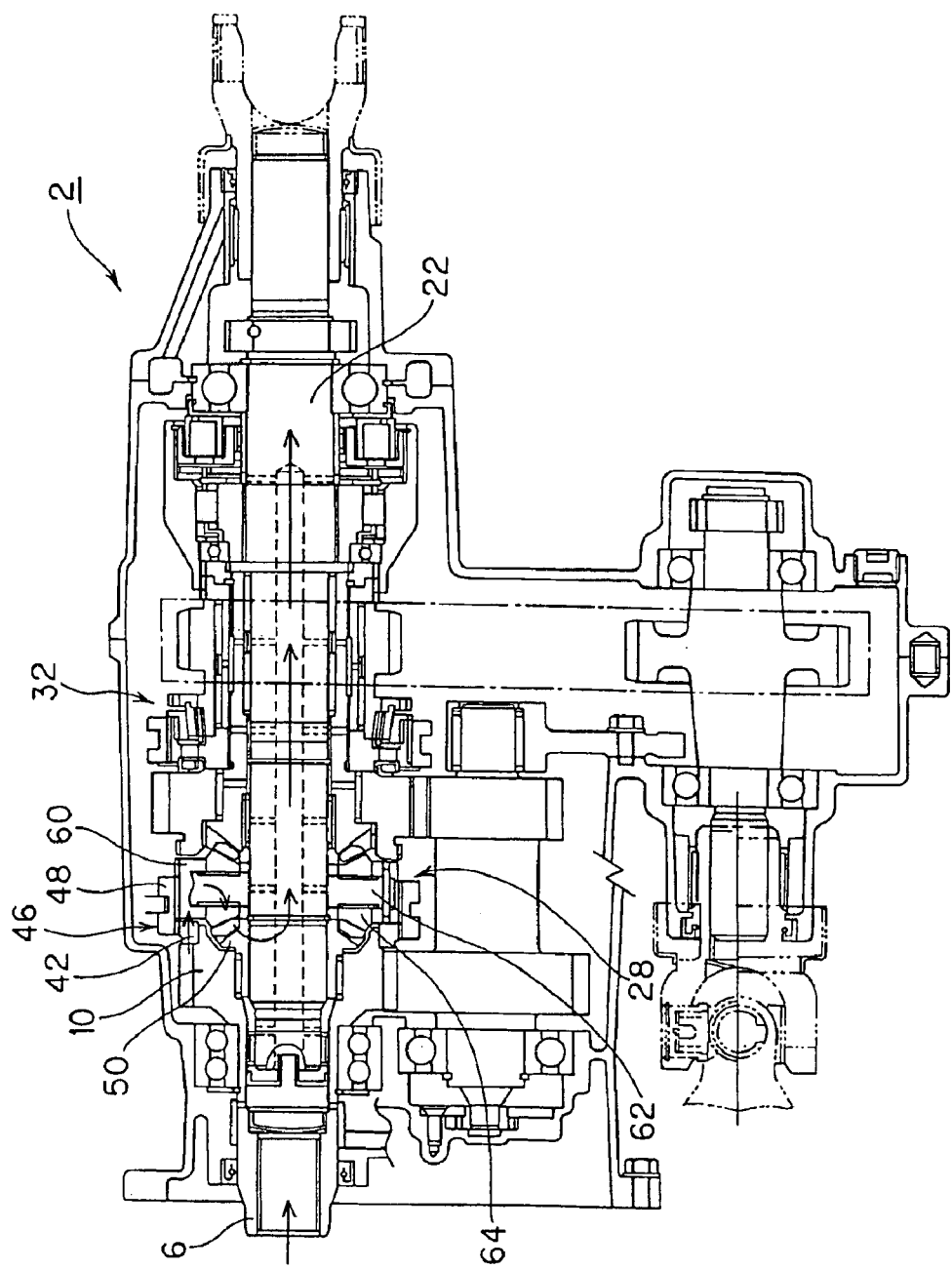
FIG. 2 is a schematic cross-sectional view of the transfer arrangement showing the path of the driving force in a "2WD Hi" (two-wheel-drive high) range.

In shifting from the neutral state to a "2WD Hi" (two-wheel-drive high) range, as shown in FIG. 2, the sleeve 48 of the engaging device 46 for shifting between high and low speeds is moved to engage with the high speed-side output part 42 associated with side gear 50, and the four-wheel drive shifting mechanism 32 is not in an engaging state.

The driving force is then transmitted from the input shaft 6 to the rear wheel-side output shaft 22 through the first gear 10, the high speed-side output part 42, the sleeve 48, and the center differential 28 including the center differential housing 60, the pinion shaft 62, the differential pinion 64, and the front differential side gear 50.

When the shifting sleeve 70 of the four-wheel shifting mechanism 32 for shifting between two-wheel and four-wheel drives is operated so as to be engaged with the sleeve engaging portion 74 through the synchronizer 76, then the sprocket 34 is driven so that the four-wheel driving state or a "4WD Hi" (four-wheel-drive high; full-time mode) range is achieved.

It is noted that in this "4WD Hi" range, by controlling the differential controller 38 to adjust the speeds of the front and rear wheel-side output shafts 36, 22, the vehicle can be in a rigid four-wheel drive mode.

Since the path of the driving force to the rear wheels in the "4WD Hi" range is similar to that in the "2WD Hi", further explanation thereof is omitted.

Figure 3:
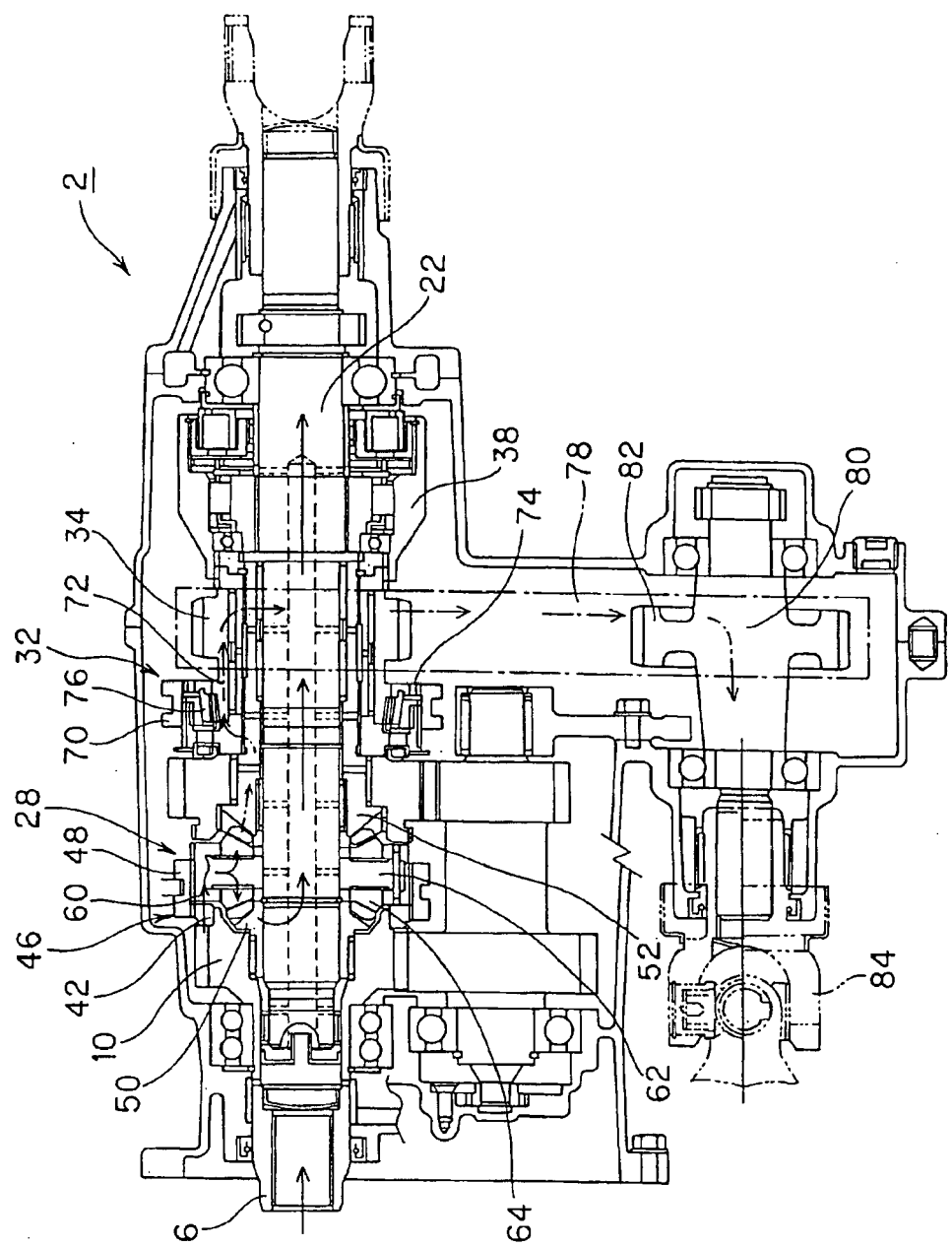
FIG. 3 is a schematic cross-sectional view of the transfer arrangement showing the path of the driving force in a "4WD Hi" (four-wheel-drive high) range.

Referring to FIG. 3, in the "4WD Hi" range, the driving force transmitted to the differential pinion 64 is transmitted to the four-wheel drive shifting mechanism 32 through the rear differential side gear 52 to the front wheel-side output shaft 36. By the sleeve 70 of the four-wheel shifting mechanism 32, which sleeve 70 is nonrotatably engaged with output shaft 36 and effects shifting between two-wheel and four-wheel drives, the driving force is then transmitted to the front wheel output portion 84 through the synchronizer 76, the sleeve engaging portion 74, the shaft portion 72, the drive sprocket 34, the conveyance member 78, the driven sprocket 82, and the driven sprocket shaft 80.

Figure 4:
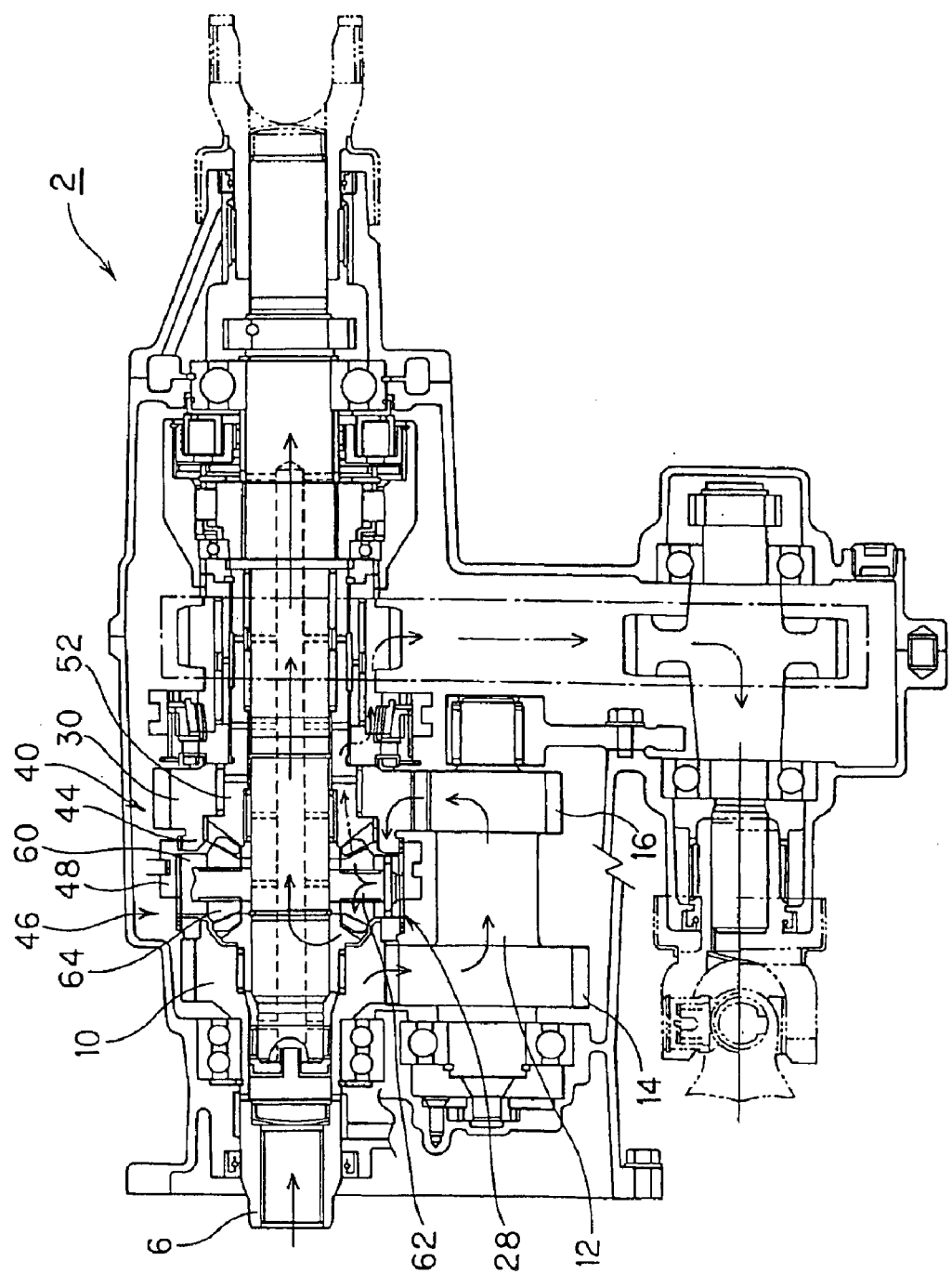
FIG. 4 is a schematic cross-sectional view of the transfer arrangement showing the path of the driving force in a "4WD Lo" (four-wheel-drive low) range.

As shown in FIG. 4, when the sleeve 48 of the engaging device 46 for shifting between high and low speeds is moved so as to be engaged with the low speed-side output part 44, the driving force is in a "4WD Lo" (four-wheel drive low) range.

The driving force in the "4WD Lo" is transmitted from the input shaft 6 through the first gear 10, the first counter gear 14 in mesh with the first gear 10, the second counter gear 16, the second gear 30, the low speed-side output part 44 in engagement with the second gear 30, the sleeve 48, the center differential housing 60, the pinion shaft 62, and the differential pinion 64. Then the driving force is distributed to both rear and front wheel-side output shafts 22, 36 in the same manner as described above.

In a conventional transfer arrangement for a four-wheel drive vehicle having an input shaft 6 into which the torque from the power source is transmitted, a transmission 40 which converts the torque of the input shaft 6 into high and low speeds, and a center differential 28 aligned with the input shaft 6 to distribute the torque output from the transmission into the front and rear wheels, when the transmission 40 is configured to have a first gear 10 attached to the input shaft 6, a first counter gear 14 attached to the countershaft 12 in parallel with the input shaft 6 to receive the rotation of the first gear 10, a second counter gear 16 integrated to the countershaft 12 and rotating therewith, and a second gear 30 aligned with the input shaft 6 and rotatably supported along the input shaft 6 to receive the rotation of the second counter gear 16, and when the first and second gears are provided with high speed-side and low speed-side output parts, it is conventionally required that a dedicated hub is disposed between the high and low speed-side output parts and is provided with an engaging device to engage with these output parts, and a connecting shaft is disposed so that it penetrates the second gear for connection with the center differential. This conventional configuration with the dedicated hub and the connecting shaft results in an increase in the axial length of the torque transfer arrangement.

On the other hand, according to this embodiment of the present invention, the center differential 28 is disposed axially between the high and low speed-side output parts 42, 44, and is provided with the engaging device 46 to selectively engage with these output parts 42, 44. This configuration eliminates the space for the dedicated hub and the connecting shaft as associated with a conventional arrangement, thereby reducing the axial length of the transfer arrangement 2, which is advantageous in practical use.

In addition, the front differential side gear 50 is supported in the bearing holding hole 58 in the first gear 10 through the needle roller bearing 56. This eliminates the separate differential case and reduces the axial length of the transfer arrangement 2 by positioning the differential side gear 50 adjacent the first gear 10.

Further, since the differential case is eliminated and the second gear 30 is directly supported on the front wheel-side output shaft 36 by the needle roller bearing 66, the second gear 30 can be disposed toward the rear differential side gear 52, thereby reducing the axial length of the transfer arrangement 2.

Still further, since the second gear 30 has a width which covers the outer circumference of the differential side gear 52 adjacent the second gear 30, the second gear 30 can be disposed axially toward and around the differential side gear 52, thereby reducing the axial length of the torque transfer arrangement 2.

Also, the drive sprocket 34 and the four-wheel drive shifting mechanism 32 which engage each other are disposed on the front wheel-side output shaft 36 which is fixed to the differential side gear 52. This permits easier assembly, which is advantageous in practical use.

Moreover, the front differential side gear 50 is connected with the rear wheel-side output shaft 22 which penetrates and extends through the rear differential side gear 52 and the front wheel-side output shaft 36. The drive sprocket 34 is equipped with the conveyance chain member 78 at the outer circumference thereof and is supported on the front wheel-side output shaft 36. Between the drive sprocket 34 and the rear wheel-side output shaft 22, rearwardly of the drive sprocket 34, the differential controller 38 is mounted to control the front and rear wheel-side output shafts 36, 22 so that they can turn at different speeds. This layout reduces the overall axial length of the torque transfer arrangement 2 having the transmission 40, the center differential 28, and the differential controller 38.

The present invention is not limited to the above-mentioned embodiment, but is adaptable for various applications and variations or modifications.

According to the above-mentioned embodiment, although the differential controller (or a roller clutch for locking the center differential) is disposed for the transfer, it can be replaced with a limited slip differential (LSD) device.

More particularly, by positioning the differential controller toward a rearmost position of the transfer arrangement, the LSD device can be disposed for replacement without substantial changes in parts positioning or inner layout.

Limitation of the dimension for the devices for replacement is not restricted largely, so that it is flexible for design, which is advantageous in practical use.

As amplified in the above description, the present invention provides a torque transfer arrangement for a four-wheel drive vehicle having an input shaft into which the torque from the power source is transmitted, a transmission which converts the torque of the input shaft into high and low speeds, and a center differential aligned with the input shaft to distribute the torque output from the transmission into front and rear vehicle wheels. The transmission includes a first gear attached to the input shaft, a first counter gear attached to a countershaft in parallel with the input shaft to receive the rotation of the first gear, a second counter gear integrated to the countershaft and rotating therewith, and a second gear aligned with the input shaft and rotatably supported along the input shaft to receive the rotation of the second counter gear. High speed-side and low speed-side output parts are attached to the first and second gears respectively. The center differential is disposed between the high speed-side and low speed-side output parts. An engaging device is disposed adjacent to the center differential to selectively engage with the high speed-side and low speed-side output parts. Accordingly, this configuration eliminates the space needed for the hub dedicated to the transmission and the connection shaft, so that the axial length of the transfer arrangement becomes smaller.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A power transfer arrangement for a four-wheel drive vehicle having an input shaft to which rotation from a power source is transmitted, a transmission which converts the rotation of said input shaft into high and low speeds, and a center differential aligned with said input shaft to distribute the rotation output from said transmission to front and rear wheels of the vehicle, comprising the improvement wherein said transmission includes a first gear attached to said input shaft, a first counter gear attached to a countershaft in parallel with said input shaft to receive the rotation of said first gear, a second counter gear attached to said countershaft and rotating therewith, and a second gear aligned with said input shaft and rotatably supported along the input shaft to receive the rotation of said second counter gear, high speed-side and low speed-side output parts attached to said first and second gears respectively, said center differential being disposed between said high speed-side and low speed-side output parts, and an engaging device disposed adjacent to said center differential to selectively engage with said high speed-side and low speed-side output parts.

2. The transfer arrangement for the four-wheel drive vehicle as defined in claim 1, wherein said center differential includes a pair of differential side gears, the differential side gear toward said first gear includes a shaft part extending into said first gear, and a bearing to support said shaft part is maintained in a bearing holding hole defined in said first gear.

3. The transfer arrangement for the four-wheel drive vehicle as defined in claim 2, wherein the differential side gear toward said second gear includes a front wheel-side output shaft extending into said second gear, and said second gear is supported on said front wheel-side output shaft through a bearing.

4. The transfer arrangement for the four-wheel drive vehicle as defined in claim 3, wherein said second gear has a tooth having a width which covers the outer circumference of said differential side gear adjacent said second gear.

5. The transfer arrangement for the four-wheel drive vehicle as defined in claim 1, wherein said center differential includes a pair of differential side gears, the differential side gear toward said second gear includes a front wheel-side output shaft extending into said second gear, and a drive sprocket is rotatably supported on said front wheel-side output shaft to transmit the rotational driving force to the front wheels, said drive sprocket being disposed adjacent to a four-wheel drive shifting mechanism which engages and disengages said front wheel-side output shaft.

6. The transfer arrangement for the four-wheel drive vehicle as defined in claim 1, wherein said center differential includes a pair of differential side gears, the differential side gear toward said second gear includes a front wheel-side output shaft extending into said second gear, the differential side gear toward said first gear is connected with a rear wheel-side output shaft extending through said differential side gear toward said second gear and said front wheel-side output shaft, a drive sprocket is supported on said front wheel-side output shaft to transmit the rotational driving force to the front wheels through a conveyance member, and a differential controller is disposed between said drive sprocket and said rear wheel-side output shaft to control said front wheel-side and rear wheel-side output shafts to turn at different speeds.

7. The transfer arrangement for the four-wheel drive vehicle as defined in claim 1, wherein said center differential includes a pair of differential side gears, the differential side gear toward said second gear includes a front wheel-side output shaft extending into said second gear, and said second gear is supported on said front wheel-side output shaft through a bearing.

8. The transfer arrangement for the four-wheel drive vehicle as defined in claim 1, wherein said first and second gears are in direct meshing engagement with said first and second counter gears, respectively.

9. The transfer arrangement for the four-wheel drive vehicle as defined in claim 1, wherein the engaging device includes a shifting sleeve disposed in surrounding relation to said center differential and being axially shiftable between front and rear positions wherein the sleeve is in driving engagement with the high speed-side and low speed-side output parts, respectively.

10. In a power transfer arrangement for a four-wheel drive vehicle, the power transfer arrangement being connected to and driven by a transmission associated with a vehicle engine, said transfer arrangement comprising:

an input shaft to which rotational torque is transmitted from the engine through the change speed transmission;

a center differential aligned with the input shaft to distribute drive torque to front and rear wheels of the vehicle;

a high/low speed transmission connected between the input shaft and the center differential for converting the rotation of the input shaft into high and low speeds which are transmitted to the center differential;

said high/low speed transmission including a first gear attached to said input shaft for rotation therewith, a first counter gear attached to a counter shaft in parallel with said input shaft and in meshing engagement with said first gear to receive the rotation thereof, a second counter gear attached to said counter shaft and rotating therewith, and a second gear aligned with said input shaft and rotatably supported therealong and maintained in meshing engagement with said second counter gear to receive the rotation thereof, and high speed-side and low speed-side output parts respectively attached to said first and second gears;

said center differential including a center differential housing mounting thereon at least one differential pinion gear, said center differential housing being supported for rotation in alignment with said input shaft and disposed axially between said high speed-side and low speed-side parts;

said center differential including first and second differential side gears disposed on opposite axial sides of said differential housing and disposed in meshing engagement with the differential pinion gear, said first differential side gear being disposed between said differential housing and said input shaft and being generally surrounded by said first gear;

said second differential side gear being disposed on an opposite axial side of said differential housing drivingly connected to a first output shaft which is coaxially aligned with the input shaft and is drivingly connectable for driving rear wheels of the vehicle and generally surrounded by said second gear, said second differential side gear being fixed to a second output shaft which concentrically and rotatably surrounds said first output shaft and is adapted for driving connection to front wheels of the vehicle; and a shiftable engaging device disposed adjacent said center differential generally axially between said high speed-side and low speed-side output parts and shiftable axially therebetween for drivingly engaging said high speed-side output part or said low speed-side output part for respectively defining high and low speeds, said shiftable engaging device being drivingly coupled to said differential housing.

11. A power transfer arrangement according to claim 10, wherein said first differential side gear is rotatably supported on said first output shaft and has a forwardly projecting stub shaft which is rotatably supported concentrically within said first gear, and wherein the second differential side gear is rotatably supported on said first output shaft.

12. A transfer arrangement according to claim 11, including a front-wheel drive member nonrotatably supported on and surrounding said second output shaft in rearward axially spaced relationship from said second gear, and a shiftable drive engaging member nonrotatably coupled to said second output shaft and shiftable axially for driving engagement with said front wheel driving member, said shiftable engaging member being positioned axially between said front wheel driving member and said second gear, and a differential controller coupled between rearward ends of said first and second output shafts at a location disposed axially rearwardly of said front wheel drive member for controlling and permitting relative rotation between said first and second output shafts.

* * * * *